United States Patent [19]

Mattei et al.

[11] Patent Number: 4,883,075

[45] Date of Patent: Nov. 28, 1989

[54] DUAL-ROD CIGARETTE MANUFACTURING MACHINE

[75] Inventors: Riccardo Mattei; Salvatore Rizzoli, both of Bologna, Italy

[73] Assignee: G. D. Societa' per Azioni, Bologna, Italy

[21] Appl. No.: 221,888

[22] Filed: Jul. 20, 1988

[30] Foreign Application Priority Data

Aug. 3, 1987 [IT] Italy ................................ 3589 A/87

[51] Int. Cl.$^4$ ............................................. A24C 5/18
[52] U.S. Cl. .................................... 131/84.4; 131/84.1
[58] Field of Search .............................. 131/84.1, 84.4

[56] References Cited

U.S. PATENT DOCUMENTS 4,336,812  6/1982  Seragnoli ........................ 131/84.4
4,564,028  1/1986  Heitmann ........................ 131/84.4
4,600,020  7/1986  Mattei et al. .................... 131/84.4

Primary Examiner—V. Millin
Assistant Examiner—Joe H. Cheng
Attorney, Agent, or Firm—Marshall, O'Toole, Gerstein, Murray & Bicknell

[57] ABSTRACT

A dual-rod cigarette manufacturing machine wherein two streams of tobacco, retained by suction on parallel conveyor belts, are subjected to the action of respective tobacco shaving devices prior to being wrapped in strips of cigarette paper; each of the aforementioned shaving devices comprising two tangent, coplanar, counter-rotating discs having respective cutting edges, and the respective shafts of which are parallel, inclined at a given angle from vertical, and the shafts lie in a plane substantially perpendicular to the two tobacco streams.

3 Claims, 2 Drawing Sheets

DUAL-ROD CIGARETTE MANUFACTURING MACHINE

BACKGROUND OF THE INVENTION

The present invention relates to a dual-rod cigarette manufacturing machine.

In particular, the present invention relates to the tobacco shaving devices which operate on the streams of shredded tobacco from which, subsequent to a wrapping operation, the continuous cigarette rods are formed.

On such machines, as described in U.S. Pat. No. 4,336,812 filed by the present Applicant, two streams of tobacco are formed by accumulating tobacco particles underneath respective supports consisting of parallel suction type conveyor belts.

As it travels along the respective said conveyor belt to cigarette forming means, each tobacco stream is subjected to a so-called shaving operation for rendering the thickness of the stream substantially constant.

On single-rod cigarette manufacturing machines, the tobacco shaving devices consist of two identical, coplanar discs, mounted on counter-rotating vertical shafts, having respective cutting edges, and with the discs arranged tangent to each other along the route traveled by the said tobacco stream.

Shaving devices of the aforementioned type, however, are too cumbersome for use on dual-rod cigarette manufacturing machines, the said two streams of tobacco, retained on respective conveyor belts travel only a small distance apart; this distance is imposed by the design of the machine and cannot be increased. To be more precise, if a shaving device of the aforementioned type were to be installed for each of the said two tobacco streams, the disc between the said two conveyor belts would obstruct the path of the second stream, thus preventing it from being fed to the said cigarette forming means.

For this reason, and as described in U.S. Pat. No. 4,304,243 filed by the present Applicant, the shaving devices on dual-rod cigarette manufacturing machines consist of pairs of identical truncated-cone discs, with each disc mounted on an inclined shaft, and the pairs of shafts are downward-converging shafts relative to each other. The said discs present respective tangent cutting edges on the wider ends, and respective generating lines aligned along the route of the respective tobacco stream. Consequently, the discs on each shaving device are inclined downwards in opposite directions from their point of contact with the said tobacco stream, thus preventing any interference with the second stream by the disc facing the same.

The grinding of truncated-cone discs of the aforementioned type, however, has been found to involve serious difficulties as compared with the flat discs employed on single-rod cigarette manufacturing machines.

SUMMARY OF THE INVENTION

The aim of the present invention is to provide an efficient tobacco shaving device employable on dual-rod cigarette manufacturing machines, and involving none of the grinding problems typically associated with shaving devices featuring truncated-cone discs.

With this aim in view, according to the present invention, there is provided a dual-rod cigarette manufacturing machine comprising means for forming two continuous streams of tobacco; two substantially parallel, coplanar conveyor belts for transferring the said tobacco streams to an unloading position; and, along the route of each of the said two conveyor belts, a device for shaving one of the said tobacco streams, and consisting of a pair of counter-rotating discs respectively located inside and outside the space between the said tobacco streams, having respective cutting edges, and arranged with the said cutting edges substantially tangent along the path of the respective said tobacco streams, the shafts of the said discs lying in a plane substantially perpendicular to the traveling direction of the said tobacco streams; characterised by the fact that, on each said shaving device, the shafts of the said pair of discs are substantially parallel, and inclined vertically at a given angle.

BRIEF DESCRIPTION OF THE DRAWINGS

The present invention will be described by way of example with reference to the accompanying drawings, in which.

DETAILED DESCRIPTION OF THE INVENTION

Figure 1:
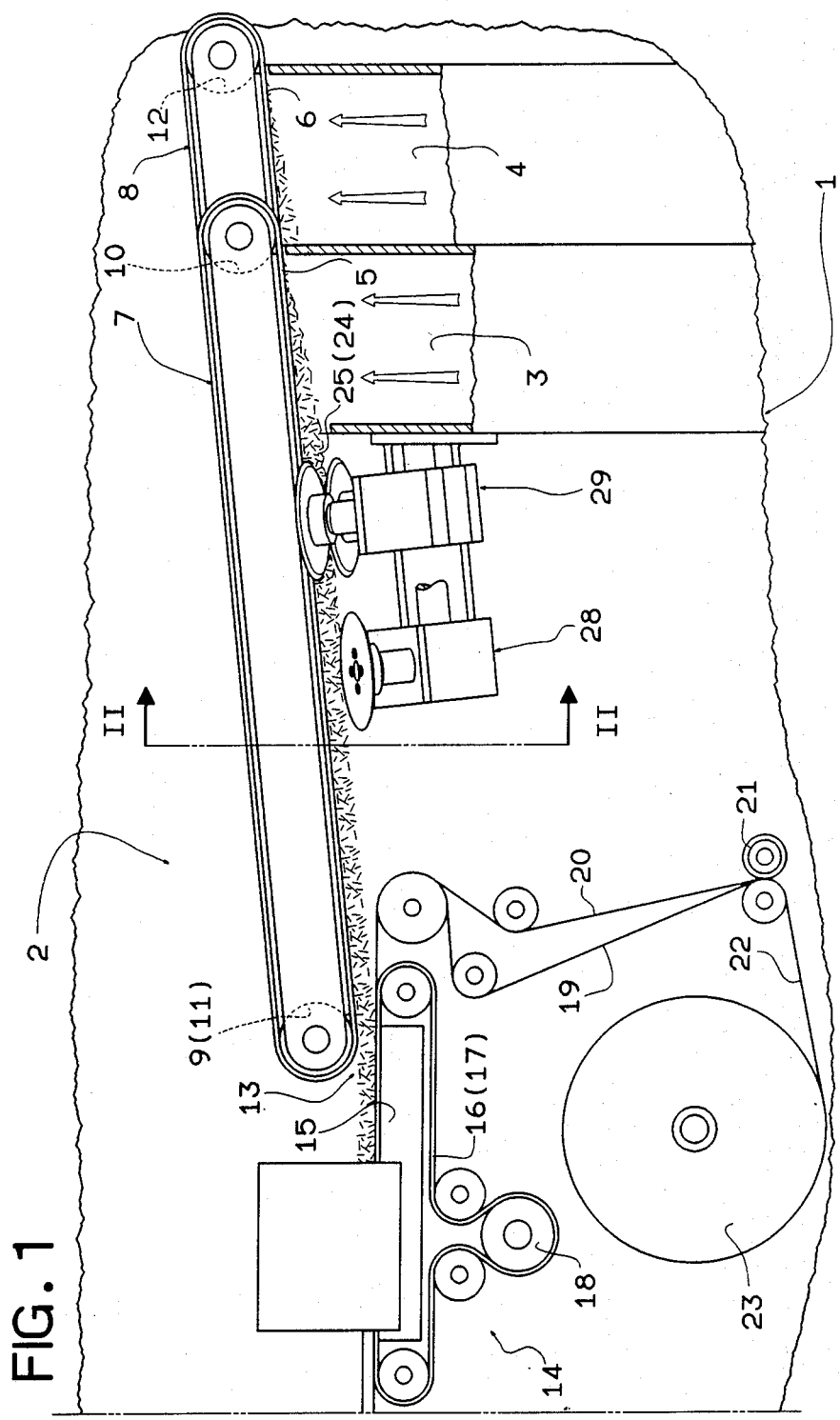
FIG. 1 shows a schematic view of a dual-rod cigarette manufacturing machine in accordance with the teachings of the present invention.

Number 1 in FIG. 1 indicates the bed of a dual-rod cigarette manufacturing machine indicated as a whole by 2. Numbers 3 and 4 indicates two ducts fed from below with a continuous stream of tobacco particles by means not shown.

By virtue of rising air current produced by a suction source (not shown), the said tobacco particles flow up ducts 3 and 4 on the bottom branches 5 and 6 of respective suction type conveyor belts 7 and 8 looped about respective end rollers 9, 10 and 11, 12. Coaxial end rollers 9 and 11 are powered so as to turn clockwise (FIG. 1), and are located lower down in relation to rollers 10 and 12, so that the said bottom branches 5 and 6 travel downwards. The said two bottom branches 5 and 6 closing the outlets of ducts 3 and 4 extend leftwards up to a so-called unloading position 13 where the tobacco is fed to section 14 of machine 2. The said unloading position 13 is located at the confluence of the said branches 5 and 6 and the respective top branches, running over horizontal surface 15, of two conveyor belts 16 and 17 (only one of which is shown in FIG. 1) looped about end rollers and powered by a counter-clockwise-rotating roller 18.

Numbers 19 and 20 indicate two strips of cigarette paper obtained by longitudinally cutting, by means of a rotary cutter 21, a strip 22 fed off a reel 23.

Figure 2:
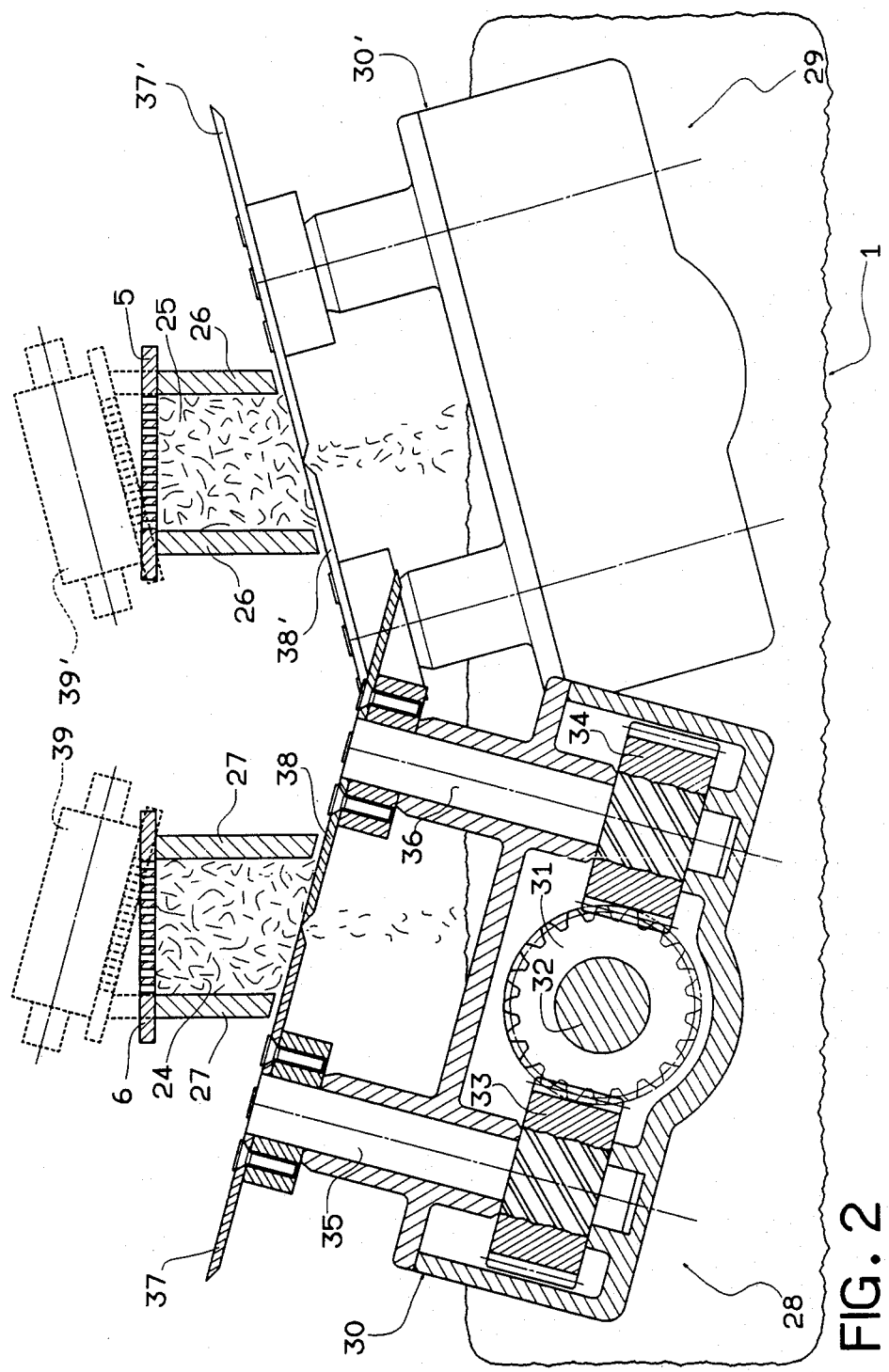
FIG. 2 shows a larger-scale section along line II—II in FIG. 1 of two tobacco devices forming part of the FIG. 1 machine.

The said ducts 3 and 4 provide for accumulating tobacco particles into respective continuous streams of tobacco 24 and 25 on respective suction branches 6 and 5 (also shown in FIG. 2). At the said unloading position 13, the said tobacco streams 24 and 25 are unloaded respectively on to paper strips 19 and 20.

As they travel along surface 15, the said strips 19 and 20 are gradually wrapped by a guide means (not shown) about the said two tobacco streams 24 and 25, so as to form two continuous cigarette rods, which are subsequently cut into cigarette lengths by a cutting device (not shown).

As shown also in FIG. 2, outside the said two ducts 3 and 4 and upstream from the said unloading position 13, tobacco streams 24 and 25 are retained by suction on branches 5 and 6, and confined laterally by respective walls 26 and 27 beneath which two shaving devices 28 and 29 operate respectively on the bottom portion of streams 24 and 25.

As the said shaving devices 28 and 29 are identical, the following description will refer solely to device 28, the component parts of device 29 in FIG. 2 being indicated using the same numbering system plus an index sign.

Shaving device 28 comprises a box-shaped body or support 30 resting on bed 1 of machine 2 and housing a gear 31 mounted on a horizontal shaft 32 connected by transmission means (not shown) to drive means (not shown) on machine 2. The said gear 31 meshes with two gears 33 and 34 fitted on to the respective bottom ends of two parallel shafts 35 and 36 lying in a plane substantially perpendicular to the traveling direction of tobacco stream 24, and inclined from vertical so that they and the corresponding shaft pair on shaving device 29 converge upward in the direction of a vertical plane parallel with tobacco streams 24 and 25 and between conveyor belts 7 and 8.

The top ends of shafts 25 and 36, outside body 30, are fitted with respective coplanar, counter-rotating discs 37 and 38 having respective cutting edges and arranged tangent to each other along the path of tobacco stream 24.

By virtue of the inclination of shafts 35 and 36, discs 37 and 38 lie in a plane forming a given angle with the horizontal plane containing branches 5 and 6. To be more precise, and as shown in FIG. 2, the planes containing pairs of discs 37, 38 and 37', 38' intersect below branches 6 and 5, along a straight line parallel with, and equidistant in relation to, tobacco streams 24 and 25.

It will be noted that, in the embodiment shown of shaving devices 28 and 29, tobacco streams 24 and 25 present a rectangular trapezoidal section, which is later converted into a circular section by compacting the tobacco in streams 24 and 25 as the latter travel through the said guide means (not shown). For producing tobacco streams 24 and 25 having a more regular cross section, similar to the rectangular cross section typical of known cigarette manufacturing machines, this may be achieved by simply placing on bottom branches 6 and 5 of conveyor belts 8 and 7, substantially over the operating location of shaving devices 28 and 29, respective positioning means consisting of two rollers 39 and 39' (as shown by the dotted lines in FIG. 2) having their respective axes perpendicular to the respective tobacco stream 24, 25, and parallel with the plane containing discs 37, 38 or 37', 38' of respective shaving device 28 or 29. The function of the said rollers 39 and 39' is to maintain the bottom branches 6 and 5 of conveyor belts 8 and 7, at the shaving location, inclined in planes parallel to those containing disc pairs 37, 38 and 37', 38', thus enabling the formation of tobacco streams having a cross section substantially in the form of a rhombus.

The advantages of the present invention will be clear from the foregoing description. As on known devices featuring truncated-cone discs, discs 38 and 38' of shaving devices 28 and 29 located between tobacco streams 24 and 25 are arranged in such a manner as to avoid obstructing tobacco streams 24, 25. Furthermore, being flat, discs 37, 38, 37' and 38' are easy to grind, thus overcoming the drawbacks typically associated with truncated-cone discs employed on known dual-rod cigarette manufacturing machines.

We claim:

1. A dual-rod cigarette manufacturing machine comprising:
   means for forming two continuous tobacco beads;
   two substantially parallel coplanar conveyor belts;
   each conveyor belt being for advancing a respective tobacco bead along a path;
   said two conveyor belts being arranged at a predetermined lateral distance from each other thereby defining a gap between them;
   an associated tobacco shaving device, for shaving a respective tobacco bead, being located along the path of each conveyor belt;
   each shaving device comprising first and second counter-rotating shafts lying in a first plane substantially perpendicular to the respective conveyor belt path;
   the shafts of each shaving device being parallel to each other, and being inclined at a given angle in relation to a vertical second plane extending parallel to said conveyor belts and through said gap;
   a first and a second shaving disc mounted on said first and second shafts of each shaving device respectively for rotation therewith; and
   the two discs of each shaving device extending in a third plane perpendicular to said first plane, and having respective cutting edges substantially tangent to each other at a point along the respective belt path, and one of said discs projecting into said gap.

2. A machine as claimed in claim 1 wherein the shafts of each said shaving device are inclined upwards towards said second plane.

3. A machine as claimed in claim 1 wherein, for each said conveyor belt, positioning means are provided associated with each said conveyor belt, and engaging the respective said conveyor belt so that said conveyor belt extends in a direction parallel to said third plane at least at the respective said point of tangency between the respective discs.

* * * * *